Dec. 20, 1955     M. J. HUFF     2,727,330

FISH HOOK ATTACHMENT

Filed Aug. 8, 1952

INVENTOR.
Marvick J. Huff

BY

Greehwells
Atty.

United States Patent Office 2,727,330
Patented Dec. 20, 1955

2,727,330

FISH HOOK ATTACHMENT

Marvick J. Huff, Kalispell, Mont.

Application August 8, 1952, Serial No. 303,206

3 Claims. (Cl. 43—44.4)

The present invention relates to improvements in a fish hook attachment.

It is the principal purpose of my invention to provide a device for securely clamping live insects such as bees, bugs, grasshoppers and the like, to a small hook in such a fashion as to leave the insect unharmed and free insofar as its wings and legs are concerned in order that it may assume a natural position, and to use the body of the insect to partially hide the hook itself.

According to my invention the clip is composed of a single piece of spring wire having a loop at one end. The wire is attached to the back of the hook shank near the curved portion containing the point or barb. The loop is formed near the end of the shank containing the hook eye and encircles the shank just behind the eye. That part of the insect's body just behind the head, is confined within the loop and drawn against the shank of the hook by the spring action of the wire.

The nature and advantages of my invention will appear more fully from the following description and the accompanying drawings. The drawings and the description are illustrative only and are not to be considered as limiting the invention except insofar as it is limited by the claims.

Figure 1:
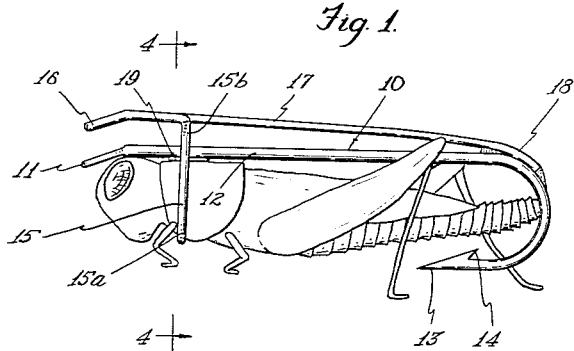
Figure 1 is a side view of a hook equipped with my invention, holding a grasshopper in place.
Figure 2:
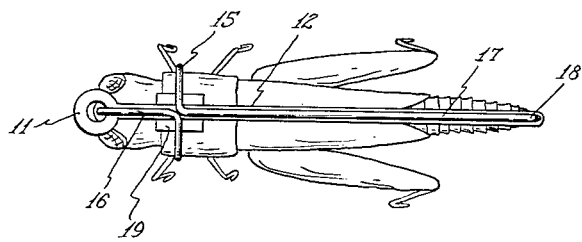
Figure 2 is a top plan view of the device showing a grasshopper clamped to the hook.

Referring now in detail to the drawings, my improved clip is shown attached to an ordinary fish hook 10. The hook has an eye 11, a shank 12, a point 13, and the usual barb 14. The construction of the hook is immaterial since my clip may be attached to any fish hook of sufficient length to attach a suitable clip.

According to my invention a piece of tempered spring wire is formed to provide a loop 15, having a forward projecting portion 16 extending perpendicularly beyond the plane of the loop for a finger piece and a rearwardly projecting portion 17 extending in the opposite direction to provide a spring arm. The end of the arm 17 is fixed at 18 to the shank 12 on the side thereof opposite the point 13 and the barb 14 of the hook. The loop 15 encircles the shank 12 of the hook at a point just behind the eye 11. A transversely extending support member 19 in the form of a plate is provided on the shank 12 at the point where said shank is encircled by the loop 15. This member 19 is arranged to provide a flat surface on the side of the shank toward the point of the hook. The surface faces toward the bottom portion 15a of the loop 15. It will be readily seen that the member 19 may be an integral part of the hook shank 12, or a separate piece as desired.

In attaching the grasshopper or other insect to the hook, the finger piece 16 of the wire is pressed toward the hook eye 11. This forces the shank 12 against the top 15b of the loop and enlarges the opening enough to insert the hopper's head and front legs through the loop. When the finger piece 16 is released the spring arm 17 of the wire, swings away from the shank and draws the bottom 15a of the loop 15 against the body of the hopper. The plate 19 forms a support against which the body of the hopper is pressed.

In this manner the hopper is securely held against the shank of the hook in such a fashion that the shank runs lengthwise of the hopper's body and that portion of the hook carrying the point and barb is curved under the rear portion of the body. The legs and wings of the grasshopper are free to move in a natural manner to lure the fish and further hide the hook from the fish.

Figure 3:
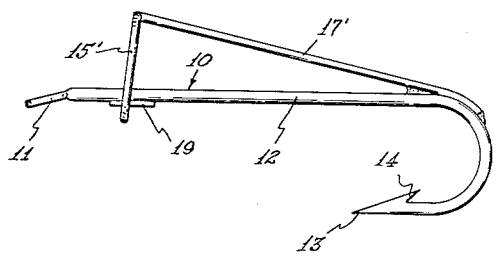
Figure 3 is a side view like Figure 1, but showing a slightly modified form of my invention.
Figure 4:
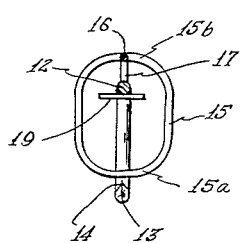
Figure 4 is a sectional view taken on the line 4—4 of Figure 1.

As a modified form of my invention (see Figure 3) I provide a piece of tempered spring wire formed substantially the same as in Figure 1, with a loop 15' and a rearwardly projecting spring arm 17' which is fastened to the hook 10 in the same manner as in the main form of the invention. In this modification of the invention, the forwardly extending finger piece of the wire is left off.

Figure 5:
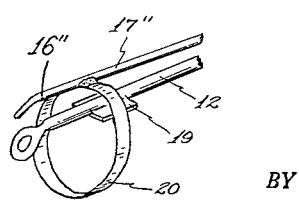
Figure 5 is a fragmentary view in perspective, showing another modified form of my invention.

In another modification shown in Figure 5, a bendable flattened wire loop 20 may be used in place of the loop 15. The flattened wire loop 20 is welded or soldered to the spring arm 17" in the same position as the loop 15 of Figure 1. A handle 16" extends forwardly from the loop 20. This bendable loop 20 may be hand formed to fit the bodies of various insects as they are used as bait.

It is believed to be obvious from the foregoing description that my invention provides a simple and effective means of attaching live insects securely to a fish hook in a natural position so that the wings and legs of the insect may move in a natural manner.

Having thus described my invention, I claim:

1. A device for clamping insects such as grasshoppers to a fish hook comprising a shank having a pointed and barbed hook portion at one end and having line attaching means at the other end, a large closed wire loop adapted to receive the body of an insect therein, said loop encircling and being spaced from the shank adjacent to the line attaching end of the shank, and a spring arm fixed to the loop and extending along the hook shank on the side of the shank that faces away from the hook portion to the hook portion and being fixed to the shank at the hook portion, the arm diverging from the shank from its attachment to the shank toward the loop normally to hold the loop predominantly on the arm side of the shank, but yielding toward the shank to open the loop on the other side of the shank for receiving the insect body.

2. A device for clamping insects such as grasshoppers to a fish hook comprising a shank having a pointed and barbed hook portion at one end and having line attaching means at the other end, a large closed wire loop adapted to receive the body of an insect therein, said loop encircling and being spaced from the shank adjacent to the line attaching end of the shank, and a spring arm fixed to the loop and extending along the hook shank on the side of the shank that faces away from the hook portion to the hook portion and being fixed to the shank at the hook portion, the arm diverging from the shank from its attachment to the shank toward the loop normally to hold the loop predominantly on the arm side of the shank, but yielding toward the shank to open the loop on the other side of the shank for receiving the insect body, the shank having a transversely extending support member fixed thereon on the side opposite said arm and within the loop against which the loop presses the insect body.

3. A device for clamping insects such as grasshoppers to a fish hook comprising a shank having a pointed and barbed hook portion at one end and having line attaching means at the other end, a large closed wire loop adapted to receive the body of an insect therein, said loop encircling and being spaced from the shank adjacent to the line attaching end of the shank, and a spring arm fixed to the loop and extending along the hook shank on the side of the shank that faces away from the hook portion to the hook portion and being fixed to the shank at the hook portion, the arm diverging from the shank from its attachment to the shank toward the loop normally to hold the loop predominantly on the arm side of the shank, but yielding toward the shank to open the loop on the other side of the shank for receiving the insect body, said loop comprising a flat strip which is hand bendable to different shapes.

References Cited in the file of this patent

UNITED STATES PATENTS

| | | |
|---|---|---|
| 764,171 | Bingenheimer | July 5, 1904 |
| 915,707 | Sheward | Mar. 16, 1909 |
| 1,613,113 | Leu | Jan. 4, 1927 |
| 2,215,612 | Hathaway | Sept. 24, 1940 |
| 2,522,073 | Trada | Sept. 12, 1950 |
| 2,573,018 | Herrick | Oct. 30, 1951 |